Figure 1:
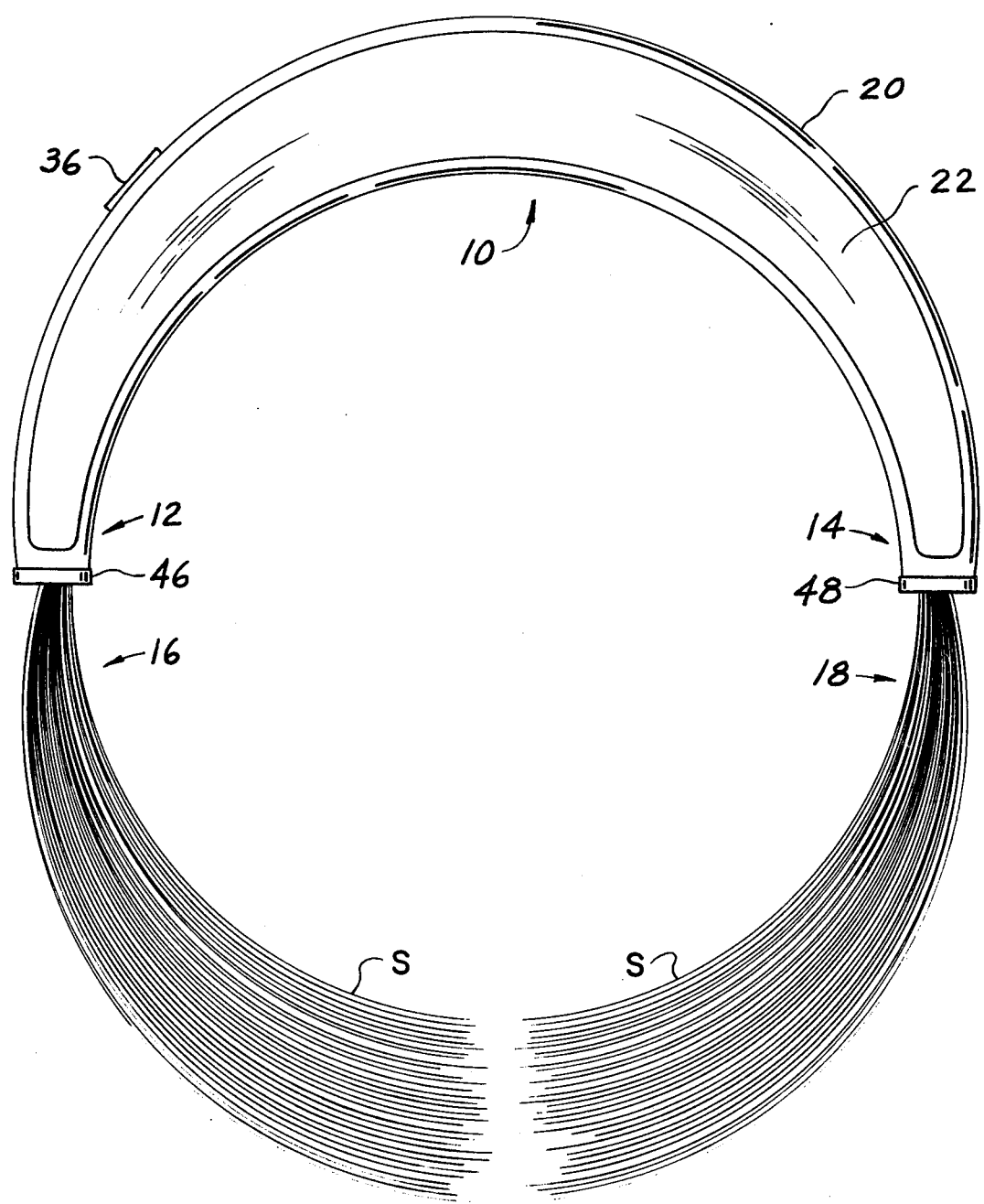

United States Patent [19]

Nadimi

[11] 4,186,425
[45] Jan. 29, 1980

[54] ILLUMINATED JEWELRY

[76] Inventor: Ahmad Nadimi, 12017 Monter Dr., Bridgeton, Mo. 63044

[21] Appl. No.: 951,360

[22] Filed: Oct. 16, 1978

[51] Int. Cl.² .............................................. F21L 15/08
[52] U.S. Cl. ...................................... 362/32; 362/104; 362/804; 350/96.22
[58] Field of Search ............... 350/96.22, 96.23, 96.24; 362/32, 104, 806

[56] References Cited

U.S. PATENT DOCUMENTS

| | | | |
|---|---|---|---|
| 2,432,632 | 12/1947 | Seibel | 362/32 |
| 2,480,393 | 8/1949 | Bossert et al. | 362/32 |
| 3,016,785 | 1/1962 | Kapany | 362/32 X |
| 3,735,113 | 5/1973 | Stott | 362/32 |
| 3,758,771 | 9/1973 | Frohardt et al. | 362/32 |
| 4,009,381 | 2/1977 | Schreiber et al. | 362/104 X |
| 4,061,910 | 12/1977 | Rosenfeld | 362/104 X |
| 4,093,973 | 6/1978 | Vaagenes | 362/104 |

*Primary Examiner*—Peter A. Nelson
*Attorney, Agent, or Firm*—Joseph A. Fenlon

[57] ABSTRACT

A piece of jewelry which comprises an elongated length of fiberoptic material, prewound into a multilooped coil and cut at one radial point, each open end of the loop being clamped to a shell containing a source of illumination in such manner that the cut ends of the various loops are exposed to the source of illumination, whereupon the individual loops extending from the shell are cut at varying lengths to present a jewelry piece, which clings to the wearer by reason of the prewound stresses in the loops, and which emits multiple dots of light as the light is transmitted through the fiberoptic material to the unclamped ends thereof.

5 Claims, 2 Drawing Figures

ILLUMINATED JEWELRY

It is the object of this invention to provide unique and novel decorative pieces of costume jewelry.

With the above and other objects in view which will become immediately apparent upon the reading of this specification, my invention resides in the unique and novel form, construction, arrangement and combination of the various parts and steps shown in the drawings, described in the specification and claimed in the Claims.

Figure 2:
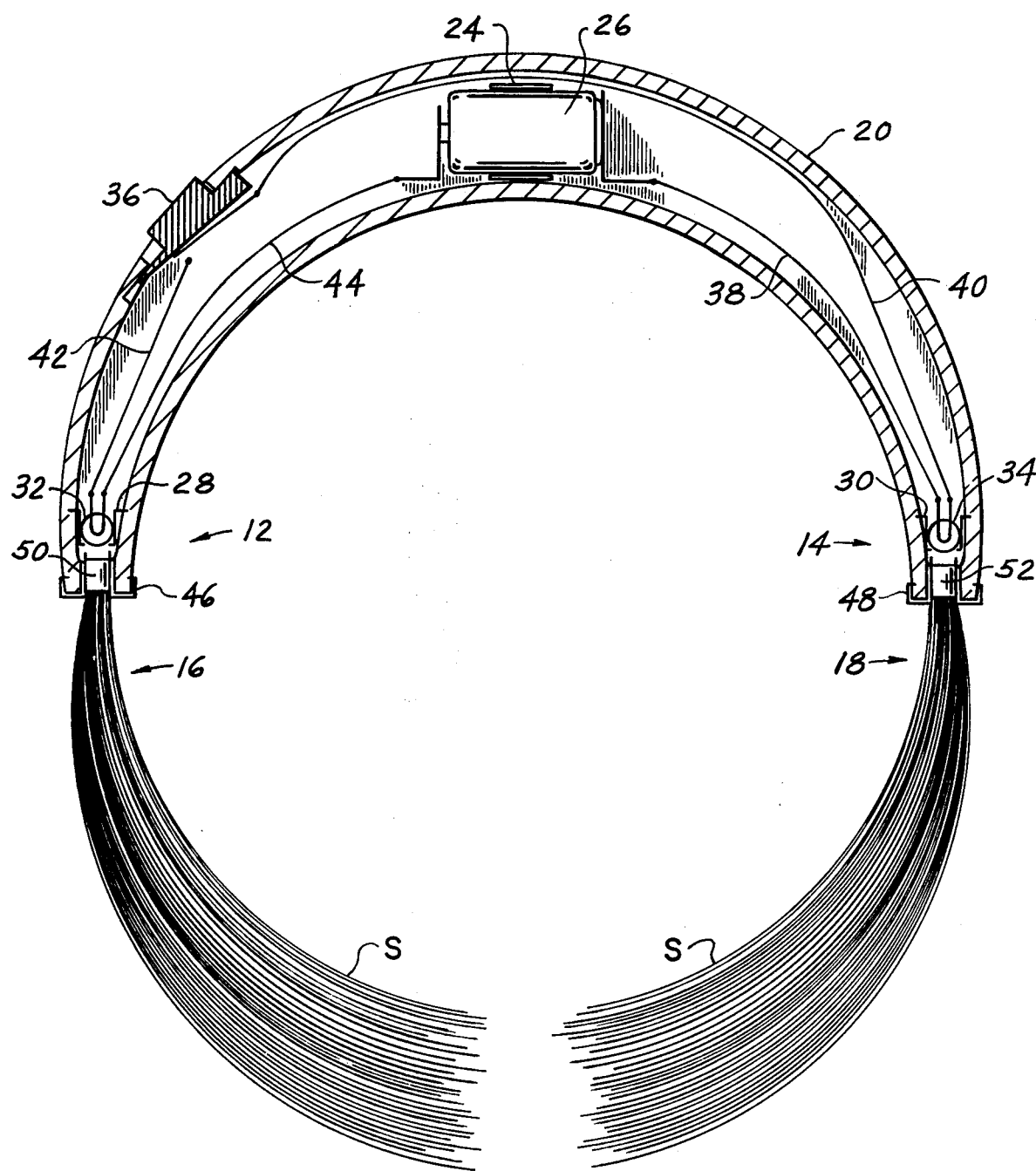

IN THE DRAWINGS:

FIG. 1 is a top plan view of an article of jewelry embodying the principles of my invention; and FIG. 2 is a sectional view taken along a horizontal plane slightly below the upper cover of FIG. 1.

Referring now in more detail and by reference character to the drawings which illustrate a preferred embodiment of my invention, there is shown a piece of jewelry including an arcuate shell 10 having opposing ends 12, 14, to each of which is respectively attached a bundle 16, 18, of fiberoptic strands S of varying lengths.

The shell 10 includes a housing 20 and a removable cover 22. Nestedly disposed in the housing is a battery clip 24 sized for accepting a battery 26 and a pair of bulb mounts 28, 30, respectively mounted adjacent the ends 12, 14, and respectively adapted for accepting bulbs 32, 34, such that, when the bulbs 32, 34, are illuminated, light will be directed toward the ends 12, 14. Also operatively mounted in the housing 20 is an electrical switch 36. An electrical wire 38 connects one terminal of the battery 26 to one terminal of the bulb 34; a second wire 40 connects the other terminal of the bulb 34 to one terminal of the switch 36; a third wire 42 connects the other terminal of the switch 36 to one terminal of the bulb 32; and a fourth wire 44 connects the other terminal of the bulb 32 to the other terminal of the battery 26, all as shown in FIG. 2.

Integrally provided in the ends 12, 14, respectively, are spring type retaining clamps 46, 48, sized for securely holding the bundles 16, 18, respectively of fiberoptic strands S.

The bundles 16, 18, are fabricated by taking an elongated length of fiberoptic material S and winding it into a multilooped coil, and thereafter taping the coil at two adjacent places thereon and then severing the coil between the tapes. The individual elements remaining are then cut at varying lengths to yield two bundles 16, 18, of fiberoptic strands S, each bundle being respectively held together at one end by a tape 50, 52.

The tapes 50, 52, are then respectively inserted in the clamps 46, 48, and the bundles 16, 18, are thereby secured to the housing 20. The removable cover 22 is then attached to the housing 20 by conventional methods and the assembly is complete.

USE

In use, the individual strands S tend to retain their circular disposition and may be readily separated and disposed about the neck, arm or calf of the wearer. It should be noted that the contour of the shell 10 will have been preformed to fit snugly against the part of the body against which the jewelry is desired to be worn. As the piece is put on the various strands S will cling against the wearer's body and the entire piece will support itself during rapid movement such as that encountered during dancing. When the switch 26 is activated closing the electrical circuit, a dot of light will be emitted at the end of each strand S. To preserve the battery, when not in use the switch 26 may be deactivated and the piece A may be easily removed for storage in a purse.

It should be apparent that changes in the form, construction, combination and arrangement of the parts and steps shown herein may be made and substituted without departing from the nature and principle of my invention.

Having thus described my invention, what I claim and desire to secure by Letters Patent is recited in the following Claims:

1. An article of jewelry comprising an arcuate shell provided with a pair of spaced ends, a bundle of light transmitting strands attached to said housing at each of said ends in such manner that one face of each of said strands is optically coupled to the interior of said shell, and means for providing illumination to the ends of the strands within the shell whereby to transmit light to the ends of said strands outside the shell.

2. The device of claim 1 wherein the shell is contoured to be flush against the body of the wearer and the strands in each bundle are pre-stressed to encircle the body of the wearer and cling thereagainst.

3. The device of claim 1 wherein the illuminating means includes a battery removably mounted in the shell, at least one light bulb removably mounted in the shell, and a manually operative switch attached to the shell and actuatable from the exterior thereof.

4. The device of claim 1 wherein the strands of each bundle are of varying length.

5. The device of claim 1 wherein the strands of each bundle are composed of fiber optic material.

* * * * *